Feb. 14, 1956  C. F. ABRESCH ET AL  2,734,520
DISHWASHING MACHINE

Filed Dec. 18, 1951  8 Sheets-Sheet 1

Fig. 1

INVENTOR.
Carl F. Abresch
Francis H. McCormick
BY
Willits, Hardman and Lehr
Attorneys

INVENTOR.
Carol F. Abresch
Francis H. McCormick
BY Willits, Hardman and Fehr
Attorneys

Feb. 14, 1956  C. F. ABRESCH ET AL  2,734,520
DISHWASHING MACHINE
Filed Dec. 18, 1951  8 Sheets-Sheet 8

INVENTOR.
Carl F. Abresch
Francis H. McCormick
BY Willits, Hardman and Fehr
Attorneys United States Patent Office 2,734,520
Patented Feb. 14, 1956

2,734,520

DISHWASHING MACHINE

Carel F. Abresch, Dayton, and Francis H. McCormick, Oakwood, Ohio, assignors to General Motors Corporation, Dayton, Ohio, a corporation of Delaware Application December 18, 1951, Serial No. 262,226

12 Claims. (Cl. 134—174)

This invention relates to a domestic appliance and more particularly to domestic dishwashing machines.

It is an object of our invention to provide a small compact dishwashing machine which is easily loaded and unloaded and washes thoroughly a large quantity of various types of dishes, tableware, cups, glasses, pots and pans at the same time if desired.

It is another object of our invention to provide a dishwashing machine in which the recirculating washing fluid is strained and which the washing fluid to be disposed of as water is used to flush the solid material out of the dishwasher.

It is another object of our invention to provide a dishwashing machine with an improved horizontal spray tube and to provide a supporting means for the articles to be washed above and at the side of the spray tube which will accommodate a maximum number of a variety of articles and will also assure excellent washing and rinsing.

It is another object of our invention to provide a cantilever supported spray tube which has additional support from the door when the door is closed.

These objects are attained by providing a dishwashing machine which is rectangularly shaped to harmonize with other cabinets and appliances in the kitchen. It includes a table top construction with the front opening door and an upper and lower rack for supporting articles to be washed. A rotatable horizontal spray tube projects streams of water radially and forwardly and rearwardly upon the articles on the rack. The initial fill comes from a spray fitting at the top of the dishwashing chamber which first flushes solid particles directly out the drain. After the initial flush period by a timer, the waste outlet valve is closed and the dishwasher is provided with a timed spray of water from the spray fitting.

When this spray fill is terminated, this water is pumped into the spray tube and recirculated. A spring mounted strainer over the outlet has sufficient restriction that during the recirculation it is drawn in a tight covering arrangement over the outlet to prevent the redeposit of solid particles upon the articles on the racks. The spray tube rotates by reason of the tangential introduction of the circulating water into the internally finned spray tube. The upper rack supports articles at the top and both sides of the spray tube leaving the spray tube free to spray the articles on the lower rack from above. The spray tube is perforated to provide solid streams of water or cleansing liquid having sufficient force to thoroughly clean the articles.

After recirculation has taken place for a sufficient period of time, the cleansing liquid is discharged as waste and the movable screen lifts and the flow of liquid to a waste carries away the solid particles out of the machine. Several cycles of initial spray, recirculation and waste discharge are provided automatically for rinsing the dishes. An electric heater is provided in the lower portion of the machine and a vent is provided adjacent the lower portion of the rear wall and a second vent is provided adjacent the upper portion of the door. The door is unsealed. Air enters the chamber at the bottom of the door and also through the second vent. This arrangement provides circulation of heated air by natural convection through the machine to dry the articles on the racks, following the washing and rinsing cycles. The door, when closed, has means which are used to support the outer end of the spray tube. The machine is able to accommodate a large quantity of articles to be washed but only a relatively small amount of water and soap are required.

Further objects and advantages of the present invention will be apparent from the following description, reference being had to the accompanying drawings, wherein a preferred form of the present invention is clearly shown.

Figure 1:
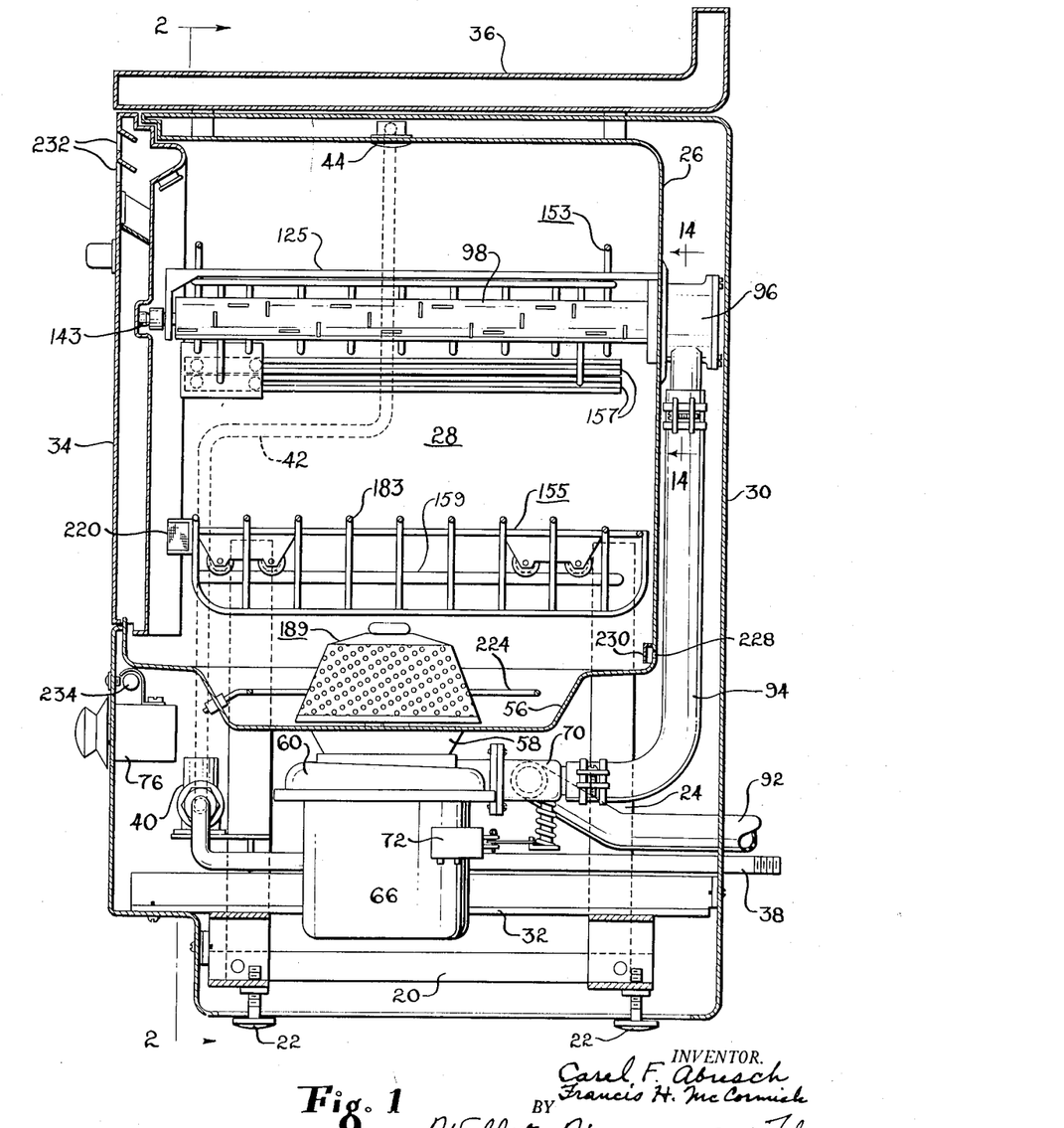
Fig. 1 is a vertical sectional view through one form of dishwashing machine embodying our invention.

Referring now to the drawings and more particularly to Fig. 1 there is shown a lower rectangular frame work 20 provided with adjustable supporting feet 22 at the four corners. Four vertical support members 24 extend upwardly from the rectangular frame 20 and are fastened to the sides of the substantially box-shaped dishwashing shell 26 enclosing the dishwashing chamber 28. Surrounding the shell 26 is an outer cabinet shell 30 having frame members 32 in its lower portion which are supported upon portions of the rectangular frame 20. The cabinet is provided with a front door 34 which pivots downwardly upon its lower edge. It cooperates with the front opening in both the inner shell and the outer cabinet shell 30. The cabinet shell 30 is provided with a table top member 36 which may be used as a work surface and may be similar to the tops of other cabinets and appliances in the kitchen.

Figure 2:
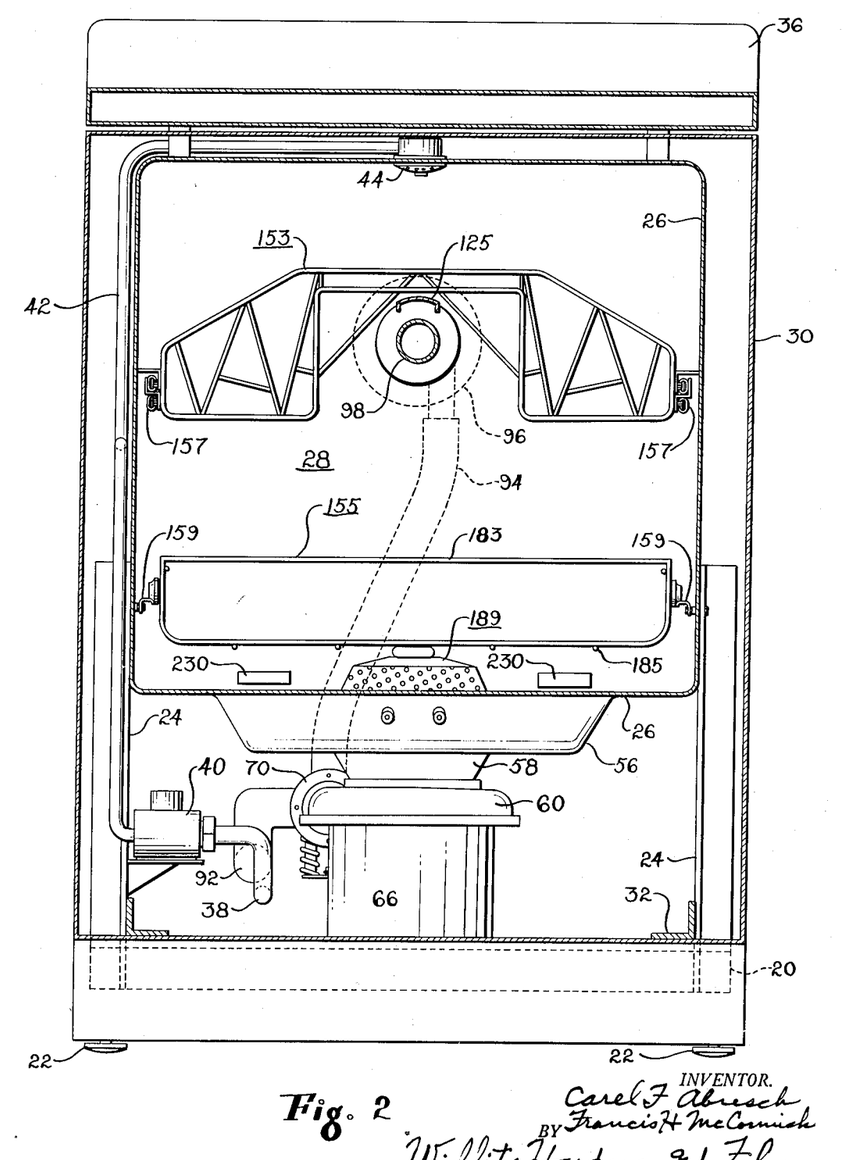
Fig. 2 is a vertical sectional view taken along the line 2—2 of Fig. 1.
Figure 13:
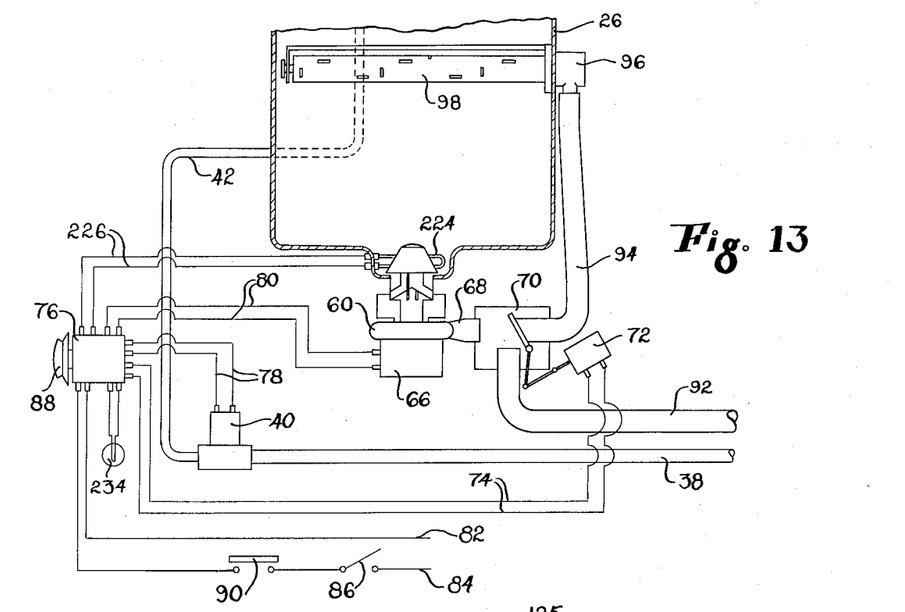
Fig. 13 is a diagrammatic view illustrating the liquid system and the control system.

Referring now more particularly to Figs. 1, 2 and 13, hot water at a temperature of from 160 degrees to 180 degrees is supplied from a suitable hot water heater through the pipe 38 under the control of the solenoid valve 40 connecting with the pipe 42 which terminates in the spray fitting 44 provided in the central portion of the top wall of the dishwashing chamber shell 26. This spray fitting 44 includes an inverted cup 46 into which the pipe 42 directly discharges. This inverted cup 46 has its rim in sealing engagement with a gasket 48 which lines the aperture in the top of the dishwashing chamber shell 26. Within the inverted cup 46 is a perforated hat-shaped member 50 which distributes the flow of liquid to the perforated discharge plate 52 which is pressed against the flange of the hat-shaped member 50 and the lower surface of the gasket 48 by the screw 54 which threads into a bushing provided in the top of the inverted cup-shaped member 46. By this arrangement the perforated plate discharges solid streams of water onto the articles within the dishwashing chamber during the initial fill as well as the two rinse fill periods.

Figures 15, 16:
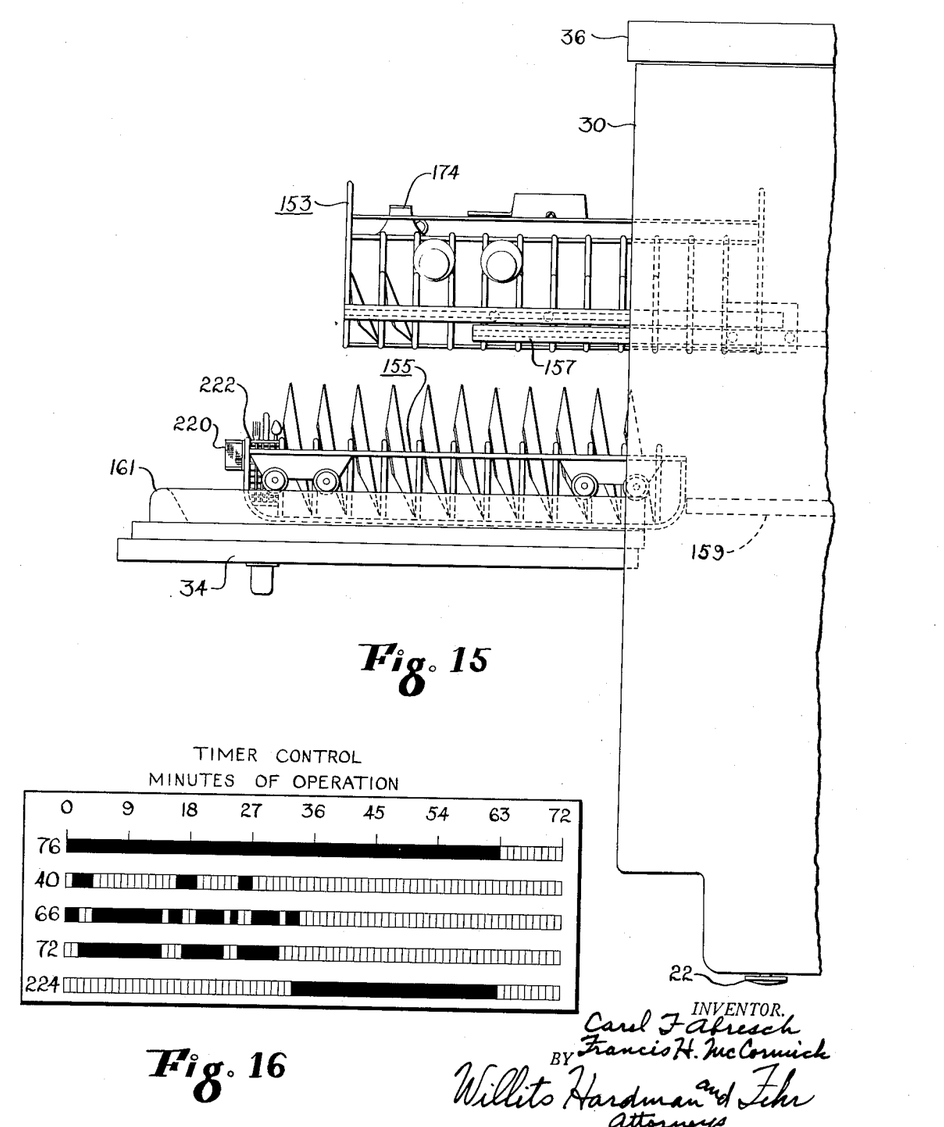
Fig. 15 is a side view of the dishwashing machine with both the upper and lower racks pulled out.
Fig. 16 is a time-operation diagram showing the sequence of operations.

The dishwashing chamber shell 26 is provided with a sunken portion 56 in the bottom thereof having an inverted conical shaped central section 58 to which is fastened the central inlet of the centrifugal pump 60. The inlet for the centrifugal pump 60 therefore serves as the outlet for the dishwashing chamber. The pump 60 includes an impeller 62 connected to the shaft 64 of the electric motor 66. The outlet 68 of the pump 60 connects directly to the solenoid operated two-way valve member 70 having an operating solenoid 72 connected by the conductors 74 to the timer 76. The timer 76 is connected by the conductors 78 with the inlet solenoid valve 40 and is connected by the conductors 80 with the pump motor 66. All the electrical energy supplied to the dishwasher is supplied through the conductors 82 and 84 which connect with the timer. The conductor 84 also includes a door controlled switch 90 which is controlled by the doors 34 and opened whenever the door 34 is opened to prevent any operation when this door 34 is opened. Fig. 16 shows the periods of energization of the timer 76, the solenoid inlet valve 40, the pump motor 66, the drain valve solenoid 72 and the electric heater 224 in one normal timer controlled dishwashing operation.

Figure 3:
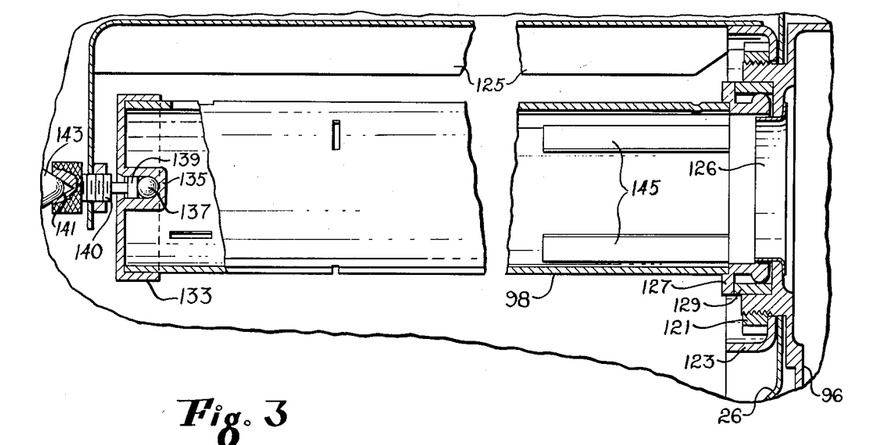
Fig. 3 is a fragmentary view partly in section of the spray tube and its bearing supports.
Figure 14:
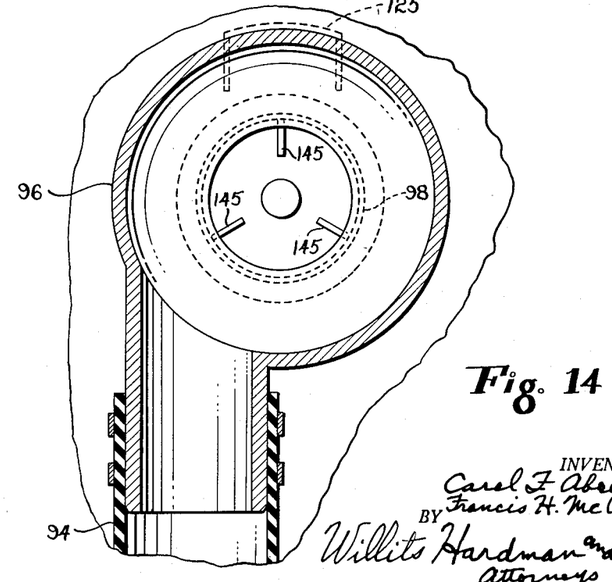
Fig. 14 is a fragmentary sectional view taken along the line 14—14 of Fig. 1 illustrating the liquid inlet for the spray tube.

The two-way valve 70 has one outlet connecting directly with the drain conduit 92. It has a second outlet connected by the tube 94 with the tangential inlet fitting 96 of the spray tube 98. Referring now more particularly to Figs. 3 and 14 this tangential inlet fitting 96 includes a flat cylindrical shaped housing having an inlet fitting connecting with the tube 94 which enters the cylindrical portion of the fitting 96 substantially along a tangent to the periphery of the fitting. The fitting 96 has a flanged portion which extends forwardly through an aperture in the upper rear wall portion of the dishwashing chamber shell 26. The periphery of this flange is threaded and a large threaded fastening nut 121 is threaded thereon to clamp the rear end portion 123 of the bearing support bracket 125, as well as the adjacent rear wall portion of the dishwashing chamber shell 26, to the inlet fitting 96 to provide a substantially rigid connection.

The inlet fitting 96 is provided with an outlet lined with a flanged ring 126 discharging directly into the interior of the tube 98. This ring 126 provides a slightly restricted passage providing a Venturi portion. The tube 98 is provided with a flanged rear bearing portion 127 which is rotatably mounted in the bearing portion 129 in the threaded flange of the inlet fitting 96. The opposite end of the spray tube 98 is closed by a cap member 133 having a central bearing portion 135 containing a ball 137 serving as an anti-friction end thrust member which is contacted by a bearing projection 139 fitting into the bearing portion 135 and adjustably supported by the threaded fitting 140 which threads into the front end portion of the bearing support 125.

Primarily, the bearing support 125 is a cantilever support which is primarily supported entirely from the rear wall of the dishwashing chamber shell 26. It is desirable that the front end of this cantilever bearing support 125 be prevented from any movement. Therefore we have provided a means whereby the front end of this cantilever bearing support 125 makes connection with the adjacent portion of the door 34 when the door is closed to prevent lateral movement of the cantilever bearing support 125. This may be employed in various forms of construction but as one example we have provided a large head upon the threaded fitting 139 having on its outer face a conical cavity 141 which, when the door 34 is in the closed position, is engaged by a flexible conical projection 143 of synthetic rubber which protrudes from the rear face of the door 34. This prevents vibration as the spray tube 98 is rotated. The interior of the spray tube 98, adjacent its inlet, is provided with three vanes 145 projecting radially inward against which the rotating inlet water impinges to apply a rotating impulse to the tube 98. An additional rotating force is applied by the contact of the rotating water with the sides of the many apertures which are formed in the tube 98 as indicated in Figs. 6 to 11.

Figure 6:
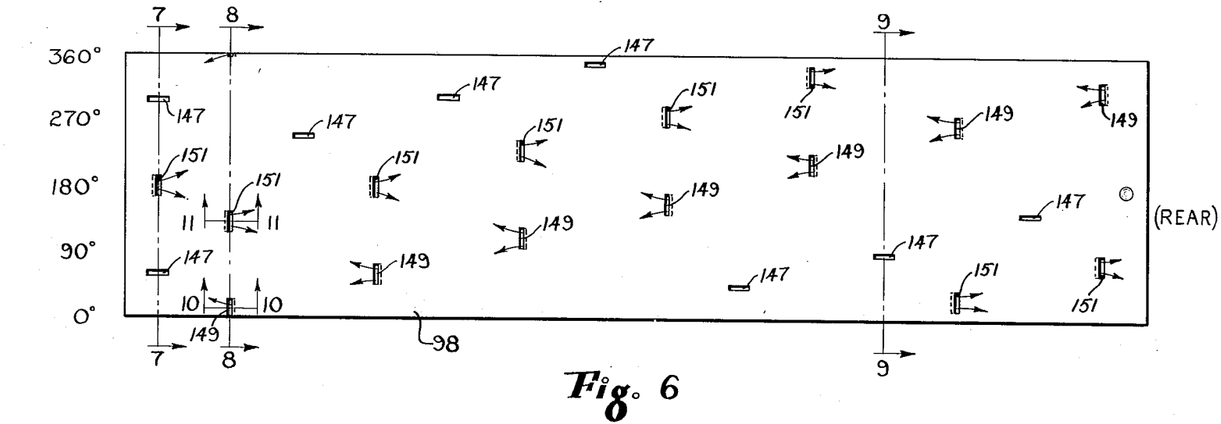
Fig. 6 is a development of the spray tube showing the location and type of apertures provided therein.
Figures 7, 8:
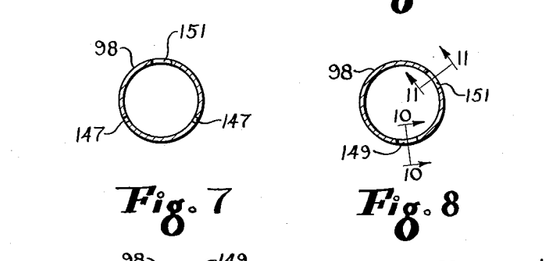
Fig. 7 is a sectional view of the spray tube taken along the line 7—7 of Fig. 6.
Fig. 8 is a sectional view of the spray tube taken along the line 8—8 of Fig. 6.
Figure 9:
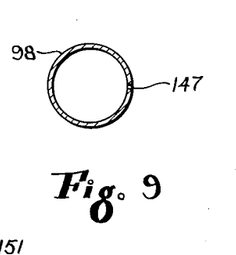
Fig. 9 is a sectional view of the spray tube taken along the line 9—9 of Fig. 6.
Figure 10:
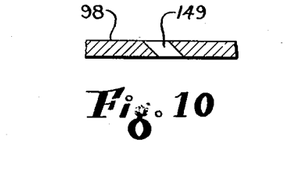
Fig. 10 is a fragmentary sectional view of one of the apertures in the spray tube taken along the line 10—10 of Figs. 6 and 8.
Figure 11:
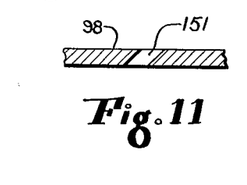
Fig. 11 is a similar sectional view taken along the line 11—11 of Figs. 6 and 8.
Figure 12:
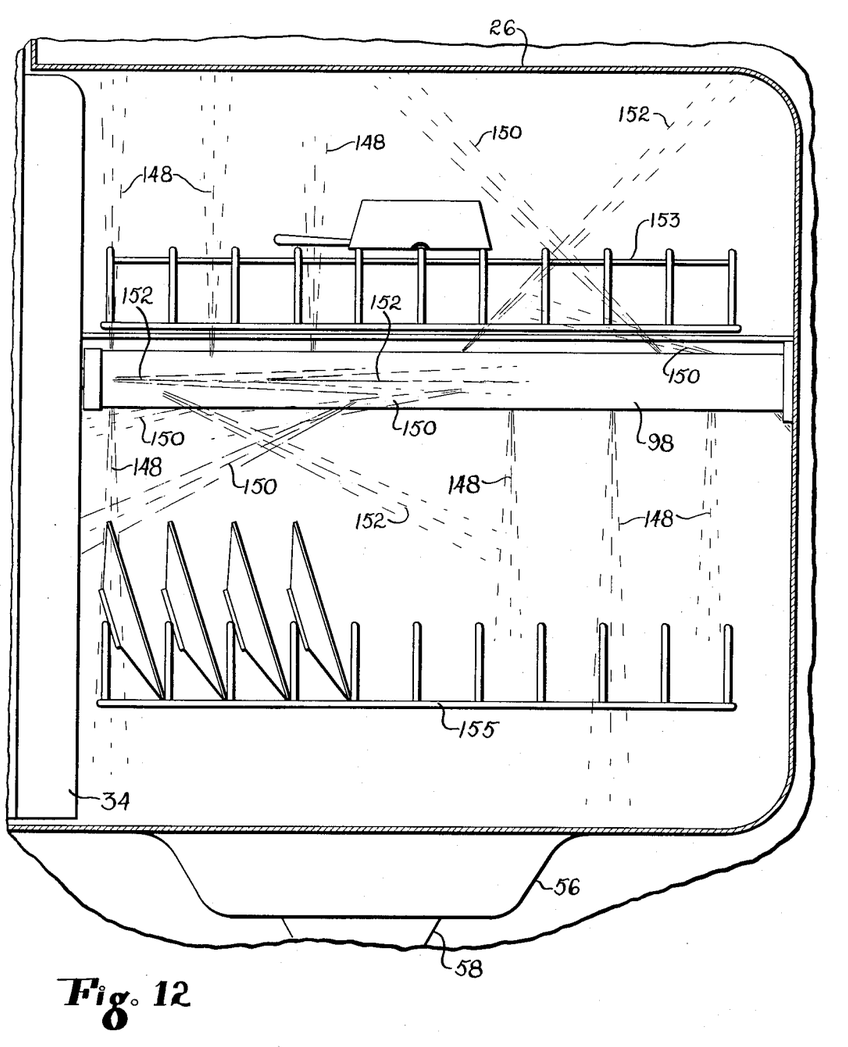
Fig. 12 is a view showing the approximate disposition of the jets of liquid issuing from the spray tube in one particular position of rotation.

As indicated in these figures, the tube 98 is formed with a series of longitudinal apertures 147, extending radially through the tube 98, which are arranged generally in the form of a helix on the tube 98. At the front end of the tube there are provided two of these longitudinal apertures in the same plane while the remainder are arranged in the form of a helix. All of these longitudinal apertures provide jets of liquid 148 extending radially from the tube. Spaced from these longitudinal apertures are transverse apertures designated by the reference characters 149 which extend through the wall of the tubing 98 at the acute angle of 45 degrees forwardly as indicated in Fig. 6 by the short curved arrows. These transverse apertures 149 are likewise arranged in the form of a helix and project the jets 150 of liquid extending forwardly at an angle of about 45 degrees to the axis of the tube 98 as shown in Fig. 12. At an angle of about 120 degrees from these apertures 149 there is provided a series of transverse apertures 151 arranged at the acute angle of about 45 degrees rearwardly as indicated by the short curved arrows. These apertures 151 are also arranged in the form of a helix as shown in Fig. 6. These transverse apertures 151 proect jets 152 of liquid rearwardly at an angle of 45 degrees to the tube 98 as shown in Fig. 12. These apertures all are sufficiently few in number and sufficiently large to provide a solid stream of water issuing therefrom having sufficient force to scrub off any matter adhering to articles in the washer. The pump 60 and its impeller 62 are driven at a sufficiently high speed by the motor 66 to insure adequate pressure for accompanying this scrubbing. The apertures are so spaced and so directed that all parts of the articles placed in the dishwater will be impinged by these jets of water coming from three different directions. Fig. 12 shows approximately the direction of the jets of water issuing from the tube 98.

To obtain the greatest effectiveness from the action of the water and cleansing fluid issuing from the apertures in the tube 98 there is provided an upper rack 153 primarily intended for small plates, saucers, cups, tumblers, pots and pans. There is also provided a lower rack 155 primarily intended for large plates, tableware, and medium-sized plates. The upper rack is mounted upon a set of drawer type guides 157. These guides include a C-shaped guide fastened to the rack, a pair of rollers of a plastic material such as nylon which roll in the upper guide but whose axes are connected to the lower guide. The C-shaped lower guide receives and is supported by a pair of spaced rollers which are fastened to the side walls of the dishwashing shell 26.

The lower rack is provided with two sets of two flanged wheels of a plastic material on either side arranged as shown in Fig. 15. These are arranged to roll upon tracks 159 fastened to the opposite side walls of the shell 26 of the dishwashing machine. The door 34 has an enlarged bead 161 which is provided in the inner sheet metal portion of the door 34 on the top and sides thereof. This enlarged bead when the door 34 is in the open position aligns itself directly with the tracks 159 provided upon the side walls of the shell 26. The flanged wheels are spaced far enough so that one of each pair of wheels will be in contact with either the track 159 of the enlarged bead 161 as the set of wheels cross the gap between the track 159 and the enlarged bead 161. This arrangement makes it possible for both the upper and lower racks to be pulled out all the way so that they can be easily and rapidly filled with articles to be washed and which can be readily and rapidly removed after the washing is completed.

Figures 17, 18:
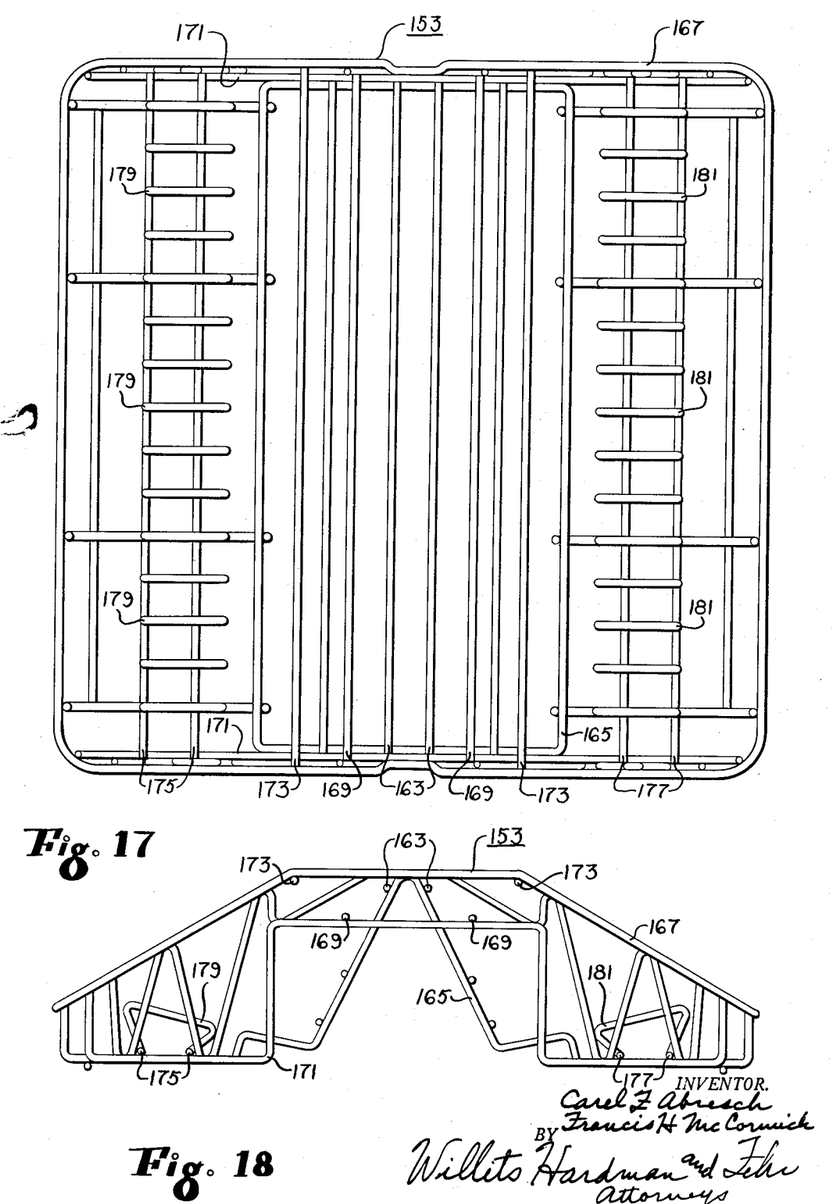
Fig. 17 is a top view of the upper rack.
Fig. 18 is a front view of the upper rack.

The upper rack includes a pair 163 of inner central longitudinal bars fastened to the inverted V-shaped frame member 165 just below the main upper frame member 167. The upper rack also includes a pair of bars 169 at the lower level fastened to a zigzag frame member 171 at both ends. In this group there is also a third pair 173 of longitudinal bars at a higher lever which are fastened to the bottom side of the frame member 167. The angle formed by the bars 163 and 169 is between about 30 degrees and 45 degrees. If desired, two rows of cups may be placed on the bars 163 and 169 with the edges of the cups resting on the bars 163 on either side. A cup so located is designated by the reference character 174. Instead of the cups or over the cups there may be placed pans of various shapes and sizes which may rest upon the pair of bars 173 or upon one of the bars 173 and one of the bars 163.

The end portions of the frame member 165 are connected by longitudinal bars as shown in Fig. 18. These cooperate on either side with the two sets of longitudinal support bars 175 and 177. These bars 175 and 177 serve as a support for small plates and saucers which contact the longitudinal bar portion of the frame member 165 and the side portions of the outer frame 167 to prevent lateral displacement. The plates and saucers are held substantially vertically by a series of inverted U-shaped wire loops 179 and 181. These wire loops have their upper portion arranged at an angle so that they may support tumblers or glasses having their rims in contact with the side portions of the member 165 and having their side walls resting upon an adjacent pair of inverted U-shaped members 179 and 181. This makes it possible to use the side portions of the upper rack for either saucers, lids, tumblers or small plates. As better shown in Fig. 2 the spray tube 98 is located in the central portion of the rack 153 so that the dishes and articles to be washed surround the spray tube on the top and both sides thereof in the rack 153.

The lower rack is of a less intricate design. It includes a plurality of spaced transverse upper bars 183 and a plurality of spaced lower longitudinal bars 185. The lower bars 185 will support large and small plates and saucers while the upper bars 183 will keep them in spaced relation so that both sides thereof will be impinged by the jets of water issuing radially and in opposite directions from the spray tube 98. The lower rack 155 has at the front a small receptacle 220 of fine wire screen material for powdered soap or detergent and a second receptacle 222 of heavy wire for tableware. The spacing of the lower rack from the upper rack permits all portions of the plates on the lower rack to receive the jets of water extending through an angle of about 120 degrees or more from the spray tube 98 in the lower portion of angle swept by the jets without any interference from the upper rack 153 or articles thereon. The lower rack 155 is primarily intended for flat articles and tableware while the upper rack may be used for both flat articles and cupped articles since the cupped articles can be supported in the upper rack in an inverted position and receive in their interior jets of water directly from the spray tube 98. The jets of water from the spray tube 98 entering the receptacle 220 dissolve the powdered soap or detergent therein to form a cleansing liquid out of the recirculating water.

Figures 4, 5:
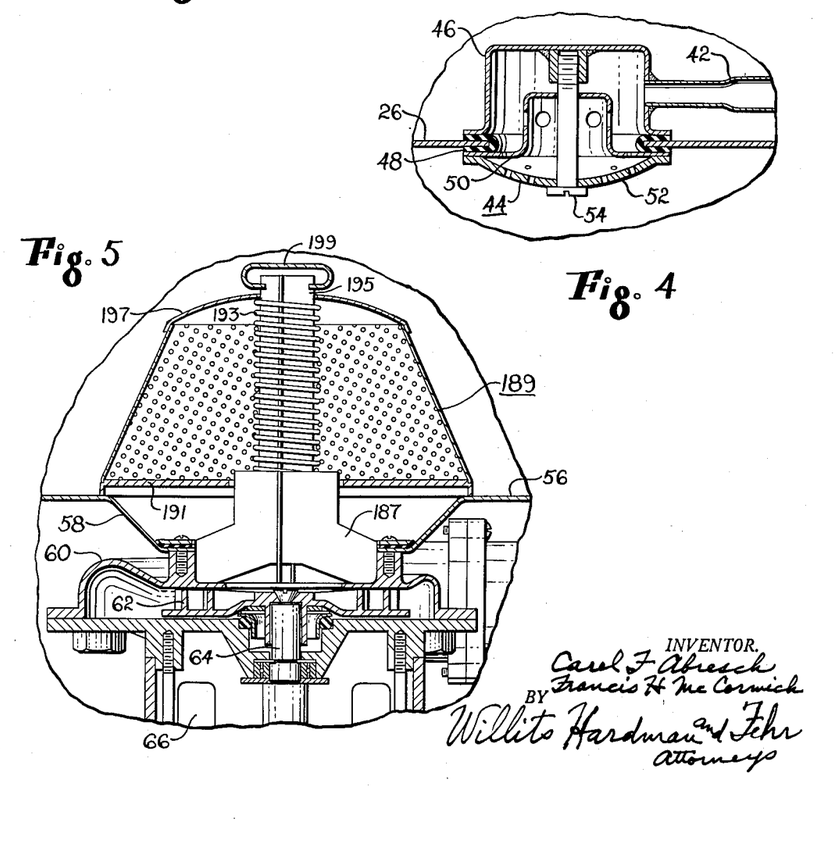
Fig. 4 is a fragmentary sectional view of the initial spray head in the top of the dishwashing chamber.
Fig. 5 is an enlarged fragmentary sectional view of the strainer, the outlet, and the recirculating pump.

After the solid matter is removed from the articles to be washed it is desirable not to redeposit it on the articles by recirculation. Recirculation is made necessary by reason of the fact that only a limited supply of the hot water is ordinarily available and the scrubbing action of the jets of water is required for a longer period of time than could be provided than merely the introduction and immediate removal of the limited amount of hot water. Consequently we have provided an automatic means whereby whenever the cleansing liquid is recirculated it is strained. For this purpose we provide a four vane guide member 187 which has its lower portion fitting directly into the flanged opening on the upper face of the pump 60 as best shown in Fig. 5. The upper portion of the member 187 fits within the strainer 189 which is in the shape of a perforated cone. The bottom of this cone is substantially closed by a disc member 191 having a central opening which receives the upper portion of the member 187. The disc member 191 has a peripherial flange which, when the strainer is dragged downwardly, engages the bottom of the sump 56 surrounding the conical portion 58 substantially in sealing engagement so that any recirculating water or cleansing liquid must flow through the strainer and large particles are caught by the strainer.

To insure that the large particles are disposed of when no recirculation is being performed, there is provided a compression type coil spring 193 mounted upon a spring guide 195 extending upwardly from the member 187. The lower end of the spring 193 rests upon the member 187 while the upper portion presses against a cap member 197 which closes the top of the perforated cone portion 189. When the drag on the strainer is light the spring lifts the strainer to a position against the stop member 199 which is fastened to the upper end of the spring guide 193. When the strainer is in its upper position, water and cleansing liquid will be sprayed over the strainer 189 washing solid particles off the strainer and beneath the lower periphery thereof into the portion 58 and into the pump 60.

The movement of the strainer 189 is determined entirely by the effect of the circulating water thereon under the control of the solenoid operated valve 70. When valve 70 is moved to a position to discharge the water through the waste conduit 92, the pump 60 will pump water or liquid at its maximum rate so that the sump 56 will be kept practically empty of liquid causing little drag on the flow of water from the sump 56 to the pump 60. Therefore during the initial filling, while the valve 70 is discharging to the waste conduit 92 the solid particles will flow under the rim of the strainer 189 into the inlet of the pump thereby carrying away the solid matter. A similar period is provided at the end of each washing and rinsing operation so that the solid matter is always carried away before the start of each consequent operation.

When the valve 70 is turned to the opposite position so that it discharges into the tube 94 and subsequently into the spray tube 98, the level of liquid in the sump 56 rises because the perforations in this spray tube 98 act as a restriction to restrict the flow of liquid out of the pump 60. This restriction reduces the rate of the pumping of water or liquid by the pump 60. This rise in liquid level in the sump 56 causes the lower half of the strainer 189 to be covered with liquid. The flow of liquid to the pump therefore must pass through a considerable portion of the perforations in the strainer 189 thereby causing a downward drag on the strainer 189 which, because of its relatively large area, is sufficient to overcome the force of the light spring 193 to pull the strainer 189 into sealing engagement with the bottom of the sump 56 as shown in Fig. 5. The conditions during recirculation will keep the strainer 187 in its lower position at all times during the recirculating cycle. In this way straining during the recirculating periods takes place automatically without any complicated mechanism or control being required. Discharge of solid particles to waste likewise takes place automatically whenever liquid is being discharged to waste.

The timer 76 controls the opening of the inlet valve 40 and the motor 66 and the solenoid 72 as shown in Fig. 16 to provide two rinsing operations following the washing operation to remove the soap or detergent as well as the residue of solid particles from the articles in the machine.

Following the rinsing and washing of the articles, it is desirable to dry them so that they may be removed and put in the place of storage. For this purpose there is provided a sheathed tubular type of electric heater 224 shaped in the form of a loop and located in the sump 56 as shown in Fig. 1. This sheathed heater 224 is connected by the conductors 226 to the timer 76. The timer provides a heating period following the last rinse period. To assist in the drying of the articles, there are provided two inlet vents 228 at the lower portion of the rear wall of the shell 26, as best shown in Fig. 1. These vents 228 are provided with a special cover 230 for preventing the escape of the cleansing liquid from the shell 26. The door 34 is made hollow and includes front and rear sheet metal faces. The door 34 is open at the bottom as shown, communicating directly with the interior of the shell 26 while the top of the door is provided with a pair of outlet vents 232 which provide communication between the interior of the door 34 and the environment atmosphere. The door 34 is unsealed. There is sufficient space beneath the door 34 to serve as an additional inlet vent. The heater 224 heats the atmosphere within the dishwashing chamber 28 and by natural convection the warm air escapes through the hollow door 34 and the vents 232 to the outside atmosphere. This causes air to be drawn in through the vents 228 and under the door and the subsequent circulation of the air heated by the electric heater 224 causes the articles in the dishwasher to be dried within a short time.

The dishwasher is also provided with a pilot light 234 connected to and controlled by the timer 76 to indicate when the dishwasher is in operation and when the dishwashing operation has been completed.

While the form of embodiment of the invention as herein disclosed constitutes a preferred form, it is to be understood that other forms might be adopted, as may come within the scope of the claims which follow.

What is claimed is as follows:

1. A dishwashing machine including generally rectangular side rear and top walls enclosing a dishwashing chamber, a door forming substantially the entire front wall enclosing the dishwashing chamber, a substantially horizontal rotatable spray tube rotatable about a horizontal axis and extending forwardly from and substantially perpendicular to the rear wall, means for supplying cleansing fluid to the spray tube, a dish supporting rack extending above the spray tube and on opposite sides of the spray tube, and means for slidably supporting said rack for movement out of the dishwashing chamber parallel to the axis of the spray tube.

2. A dishwashing machine including generally rectangular side rear and top walls enclosing a dishwashing chamber, a door forming substantially the entire front wall enclosing the dishwashing chamber, a substantially horizontal rotatable spray tube rotatable about a horizontal axis and extending forwardly from and substantially perpendicular to the rear wall, means for supplying cleansing fluid to the spray tube, a dish supporting rack extending above the spray tube and on opposite sides of the spray tube, and means for slidably supporting said rack for movement out of the dishwashing chamber parallel to the axis of the spray tube, and a second dish supporting rack located beneath the spray tube.

3. A dishwashing machine including generally rectangular side rear and top walls enclosing a dishwashing chamber, a door forming substantially the entire front wall enclosing the dishwashing chamber, a substantially horizontal rotatable spray tube rotatable about a horizontal axis and extending forwardly from and substantially perpendicular to the rear wall, means for supplying cleansing fluid to the spray tube, a dish supporting rack extending above the spray tube and on opposite sides of the spray tube, the portions of the rack on opposite sides of the spray tube being provided with means for supporting plates substantially perpendicular to the axis of the spray tube.

4. A dishwashing machine including a rectangular walled enclosure enclosing a dishwashing chamber, a substantially horizontal spray tube rotatable about a horizontal axis and extending substantially from one wall to another within the dishwashing chamber, said spray tube having discharge ports directed radially and discharge ports directed at an acute angle to the axis of the tube in both directions, a rack having supporting means in the area above the spray tube for supporting a row of inverted receptacles parallel to the spray tube, said rack having supporting means on one side of the spray tube for supporting a row of tumblers with the tumblers having their axes located radially perpendicular to the axis of the spray tube but slightly inclined downwardly toward the spray tube.

5. A dishwashing machine including generally rectangular side rear and top walls enclosing a dishwashing chamber, a door forming substantially the entire front wall enclosing the dishwashing chamber, a substantially horizontal spray tube rotatable about a horizontal axis and extending forwardly from and substantially perpendicular to the rear wall, and means adjacent the end of the spray tube nearest the door for engagement with an adjacent portion upon the door when the door is closed for supporting the tube.

6. A dishwashing machine including generally rectangular side rear and top walls enclosing a dishwashing chamber, a door forming substantially the entire front wall enclosing the dishwashing chamber, a substantially horizontal rotatable spray tube rotatable about a horizontal axis and having a bearing means adjacent the rear wall and a cantilever supported bearing means adjacent the front wall, and means provided upon said cantilever supported bearing means for engagement with an adjacent portion upon the door when the door is closed for preventing movement of said cantilever supported bearing means.

7. A dishwashing machine including fixed top, bottom, rear and side walls enclosing a dishwashing chamber; a substantially horizontal rotatable spray tube rotatable about a horizontal axis and extending forwardly from the rear wall, means for supplying cleansing fluid to and rotating the spray tube, a dish supporting rack extending substantially the greater portion of the distance between the side walls having a portion extending over said spray tube, said walls having a door opening at the front sufficiently wide and high to permit the horizontal movement in the forward direction of said dish supporting rack, and door means for closing said door opening.

8. A dishwashing machine including fixed top, bottom, rear and side walls enclosing a dishwashing chamber; a substantially horizontal rotatable spray tube rotatable about a horizontal axis and extending forwardly from the rear wall, means for supplying cleansing fluid to and rotating the spray tube, a dish supporting rack extending substantially the greater portion of the distance between the side walls having a portion extending over said spray tube, said walls having a door opening at the front sufficiently wide and high to permit the horizontal movement in the forward direction of said dish supporting rack, means for movably supporting said rack for horizontal movement parallel to said spray tube into and out of said dishwashing chamber, and door means for closing said door opening.

9. A dishwashing machine including fixed top, bottom, rear and side walls enclosing a dishwashing chamber; a substantially horizontal rotatable spray tube rotatable about a horizontal axis and extending forwardly from the rear wall, means for supplying cleansing fluid to and rotating the spray tube, a dish supporting rack extending substantially the greater portion of the distance between the side walls having a portion extending over said spray tube, a second dish supporting rack extending substantially the greater portion of the distance between the side walls beneath said spray tube, said walls having a door opening at the front sufficiently wide and high to permit a horizontal movement in the forward direction of both dish supporting racks, and door means for closing said door opening.

10. A dishwashing machine including fixed top, bottom, rear and side walls enclosing a dishwashing chamber, a substantially horizontal rotatable spray tube rotatable about a horizontal axis and extending forwardly from the rear wall, means for supplying cleansing fluid to and rotating the spray tube, a dish supporting rack extending substantially the greater portion of the distance between the side walls having a portion extending over said spray tube, said walls having a door opening at the front sufficiently wide and high to permit the horizontal movement in the forward direction of said dish supporting rack, and door means for closing said door opening, said spray tube being provided with a bearing adjacent its front end, a cantilever support fastened to the rear wall and extending forwardly beneath said rack substantially parallel to the axis of the spray tube provided with a bearing adjacent its front end cooperating with said bearing adjacent the front end of said spray tube.

11. A dishwashing machine including walls enclosing a dishwashing chamber, a rotatable horizontal hollow spray tube rotatable about a horizontal axis and, said spray tube having an open end, an inlet fitting having a centrally located outlet enclosing the open end of said spray tube, said inlet fitting having a tangential inlet and a chamber communicating with said open end, said fitting being supported by one of said walls, and means for conveying washing liquid through said tangential inlet into said spray tube, said spray tube containing a plurality of internal blades reacting with the liquid flowing from the tangential inlet into the spray tube for rotating the spray tube.

12. A dishwashing machine including walls enclosing a dishwashing chamber, said walls including a rear wall and a door opening opposite said rear wall, a horizontal rotatable hollow spray tube rotatable about a horizontal axis and within said dishwashing chamber provided with bearings at its opposite ends, said tube having an open end, an inlet fitting mounted on said rear wall connected for discharge through said open end into the interior of said hollow tube and having a bearing cooperating with the adjacent bearing on said tube, a cantilever bracket connected to said rear wall adjacent said inlet fitting and extending substantially parallel to said tube and provided with a bearing extending into cooperating relationship with the tube bearing remote from said inlet fitting.

References Cited in the file of this patent

UNITED STATES PATENTS

| | | |
|---|---|---|
| 486,180 | Hollister | Nov. 15, 1892 |
| 1,386,734 | Rosenbaum | Aug. 9, 1921 |
| 1,417,162 | Gagen | May 23, 1922 |
| 1,597,361 | Hazard et al. | Aug. 24, 1926 |
| 1,927,665 | Kirby | Sept. 19, 1933 |
| 2,649,765 | Anderson | Aug. 25, 1953 |
| 2,681,658 | Meeker et al. | June 22, 1954 |

FOREIGN PATENTS

| | | |
|---|---|---|
| 16,447 | Germany | Jan. 4, 1882 |